UNITED STATES PATENT OFFICE.

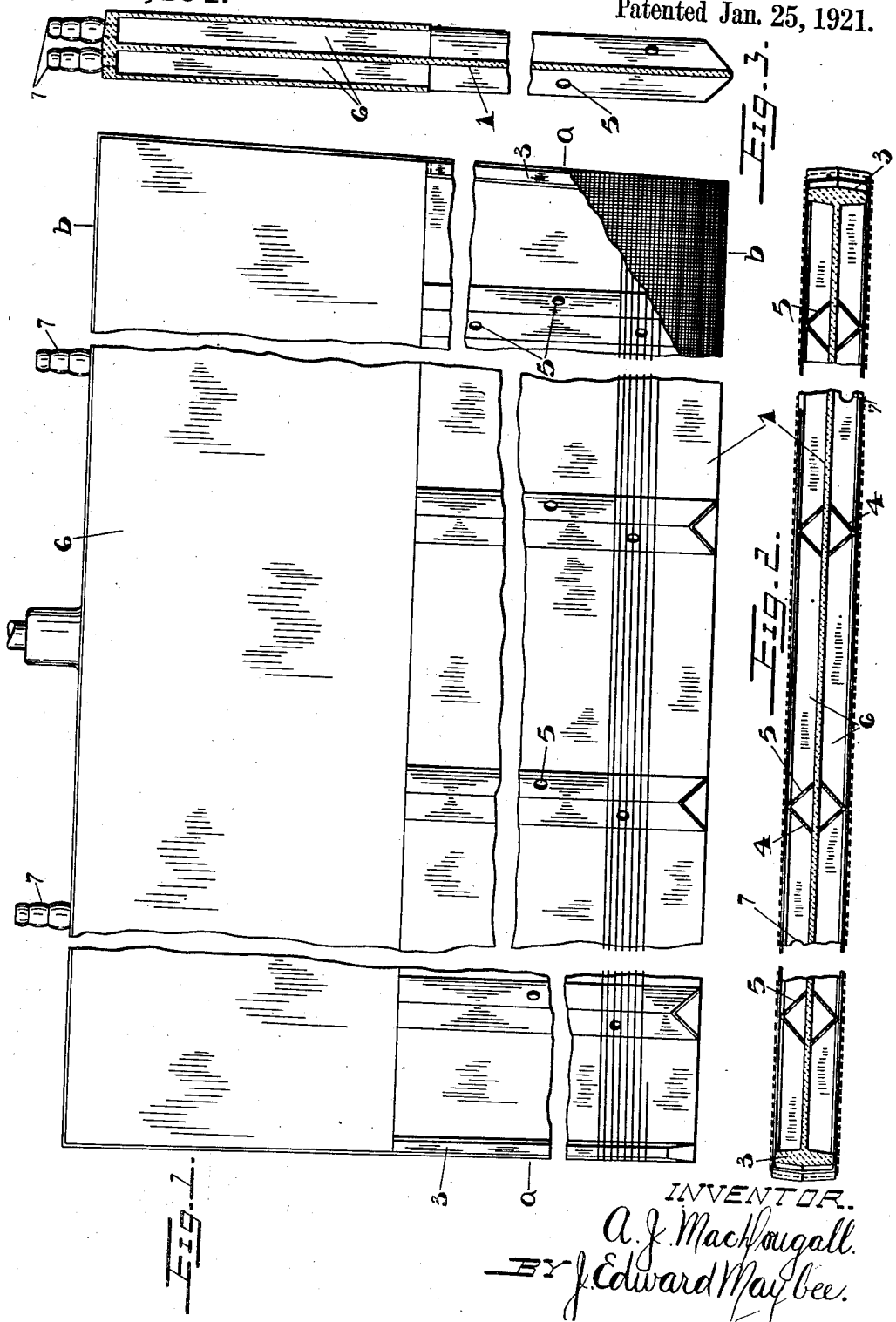

ARCHIBALD J. MacDOUGALL, OF TORONTO, ONTARIO, CANADA, ASSIGNOR TO NATIONAL ELECTRO PRODUCTS, LIMITED, OF TORONTO, CANADA.

ELECTRODE.

1,366,404.      Specification of Letters Patent.      Patented Jan. 25, 1921.

Application filed July 2, 1919. Serial No. 308,212.

*To all whom it may concern:*

Be it known that I, ARCHIBALD J. MAC-DOUGALL, of the city of Toronto, in the county of York, Province of Ontario, Canada, have invented certain new and useful Improvements in Electrodes, of which the following is a specification.

This invention relates particularly to electrodes for use in electrolytic apparatus used in the decomposition of liquids to produce gases, and my principal objects are to produce an electrode which, for the same capacity, is very much lighter than electrodes of the type disclosed in my co-pending application No. 228358 filed April 4th, 1919, and in which the possibility of the formation of destructive arcs between adjacent conductors is reduced to a minimum.

I attain my object by forming the supporting frame electrode of a plate of non-conducting material provided at each side with vertical ribs, which ribs support, at each side of the plate, a plurality of electrode members, each member being in electrical connection with at least one similar member opposite to it at the other side of the plate. The electrode members will in practice be formed of wires, the wire forming an electrode member at one side of the plate being integral with the wire forming the opposed electrode member at the other side of the plate. A convenient method of construction is to spirally wind the wire on the plate so that all the members at both sides of the plate are electrically connected.

The invention is illustrated in the accompanying drawings in which—

Figure 1 is a side elevation, partly broken away, of an electrode constructed in accordance with my invention;

Fig. 2 a longitudinal section of the same on the line *a—a* in Fig. 1; and

Fig. 3 a vertical section of the same on the line *b—b* in Fig. 1.

In the drawings like numerals of reference indicate corresponding parts in the different figures.

The supporting frame of the electrode is formed of a plate 1 of non-conducting material, which is not affected by the electrolyte to be used in the electrolytic cell. For many purposes hard rubber will be found suitable.

On this plate and spaced therefrom I support at each side a plurality of electrode members each member being directly electrically connected with a similar member at the opposite side of the plate, so that a bipolar electrode is formed by the two members, the anodic part at one side of the plate and the cathodic at the other. By "directly electrically connected" it should be understood that I mean connected by a solid conductor, not merely through the electrolyte. The electrode members are preferably formed of wire, each anodic member being integral with the opposite cathodic member. The best method of forming the electrode members is to wind the wire helically on the plate, the latter being formed with vertical ribs which serve to space the electrode members from the surface of the plate. In this construction not only are the pairs of electrode members electrically connected which is essential, but all the separate electrodes formed by such pairs are also connected, which is not altogether a desirable feature but which greatly facilitates manufacture.

At each end of the plate I therefore form at each side a rib 3, which ribs not only serve to support the wire, but form the outer walls of vertical channels, the other walls of which are formed by the ribs 4. These ribs 4 are hollow as shown, being preferably V-shaped and provided with a series of openings 5 for the passage of the electrolyte. These ribs 4 do not extend to the top of the plate 1, and the plate above the upper ends of the ribs 4 has a chamber 6 formed at each side, which chambers are open at their lower sides so as to be in communication not only with the hollow spaces within the ribs 4, but also with the channels between the ribs 3 and 4. Outlets 7 are provided from the chambers 6, through which gases accumulating in the chamber may be withdrawn.

As in the constructions illustrated in the prior application hereinbefore referred to, the electrode is inclosed in a sheath 8 of porous non-conducting material, or at least having the faces contacting with the electrode on non-conducting material. The wire or wires employed to form the electrode members are preferably of a relatively small cross sectional area and of such a length that the conductivity of each member is small relative to the total current. The possibility of the formation of destructive arcs is thus reduced to a minimum, as no one member will carry current sufficient for the formation of such arcs. Numerous other advantages result from the construction hereinbefore described. The electrode is exceedingly light as compared with all-metal electrodes of the type disclosed in the application hereinbefore referred to, while it is possible to obtain the gases which are the result of the electrolysis of an electrolytic in a high degree of purity, they being generated at opposite faces of each electrode and directed or confined by the sheath enveloping the electrode in the entirely separated channels and spaces at opposite sides of the electrode. As the gases flow up the channels between the ribs, the return flow of the electrolyte is downward through the hollow ribs 4, which distribute the electrolyte over the faces of the electrode through the openings 5.

What I claim as my invention is:—

1. A bi-polar electrode comprising a plate of non-conducting material having a gas chamber formed at the top at each side, each chamber having an open bottom; and a series of electrode members formed of wire, located at each side of the plate below said chambers and spaced from the plate by vertical spacers.

2. A bi-polar electrode constructed as set forth in claim 1 provided with a sheath of porous material fitted over the electrode and embracing the opposite faces, whereby gas and electrolyte spaces are formed by the electrode and the sheath communicating with the chambers aforesaid.

3. A bi-polar electrode constructed as set forth in claim 1 provided with hollow vertical ribs at each side forming the spacers, their upper ends communicating with the chambers aforesaid, and provided with a series of holes for the passage of the electrolyte.

4. A bi-polar electrode constructed as set forth in claim 2 in which the conductivity of each electrode member is small relative to the total current transmitted by the electrode.

5. A bi-polar electrode comprising a plate of non-conducting material provided with a series of ribs of non-conducting material; a series of electrode members at each side of the plate spaced therefrom by the ribs; and a sheath of porous non-conducting material fitted over the electrode and embracing the electrode members at each side.

Signed at Toronto, Canada, this 10th day of June, 1919.

ARCHIBALD J. MacDOUGALL.